United States Patent [19]

Smith et al.

[11] Patent Number: 4,559,318

[45] Date of Patent: Dec. 17, 1985

[54] SUPPORTED VANADIUM DIHALIDE-ETHER COMPLEX CATALYST

[75] Inventors: Paul D. Smith; Joel L. Martin, both of Bartlesville, Okla.

[73] Assignee: Phillips Petroleum Company, Bartlesville, Okla.

[21] Appl. No.: 682,726

[22] Filed: Dec. 17, 1984

Related U.S. Application Data

[63] Continuation-in-part of Ser. No. 488,887, Apr. 26, 1983, abandoned.

[51] Int. Cl.$^4$ ................................................ C08F 4/68
[52] U.S. Cl. .................................... 502/110; 502/104; 502/114; 502/120; 502/126; 526/129; 526/132; 526/142
[58] Field of Search ............... 502/104, 110, 114, 120, 502/126

[56] References Cited

U.S. PATENT DOCUMENTS

| | | | |
|---|---|---|---|
| 2,910,461 | 10/1959 | Nowlin et al. | 260/94.9 |
| 2,962,451 | 11/1960 | Schreyer | 502/114 |
| 3,301,834 | 1/1967 | Christman | 260/80.5 |
| 3,345,351 | 10/1967 | McCall et al. | 260/93.7 |
| 3,369,011 | 2/1968 | Valvassori et al. | 260/88.2 |
| 3,422,082 | 1/1969 | Vandenberg | 260/92.8 |
| 3,453,250 | 7/1969 | Natta et al. | 260/88.2 |
| 3,489,733 | 1/1970 | Natta et al. | 260/80.78 |
| 3,701,766 | 10/1972 | Delbouille et al. | 260/93.7 |
| 3,702,309 | 11/1972 | Ziegler et al. | 502/117 |
| 3,880,819 | 4/1975 | Natta et al. | 260/80.78 |
| 3,888,789 | 6/1975 | Dombro et al. | 502/104 |
| 4,017,699 | 4/1977 | Hellman | 200/670 |
| 4,063,009 | 12/1977 | Ziegler et al. | 526/159 |
| 4,097,659 | 6/1978 | Creemers et al. | 526/151 |
| 4,173,698 | 11/1979 | Kanoh et al. | 526/142 |
| 4,223,117 | 9/1980 | Sano et al. | 526/121 |

OTHER PUBLICATIONS

Hall et al, "Application of High Pressure Spectroscopy to The Study of Interactions of Small Gaseous Molecules with Transition Metal Complexes and Organometallic Compounds", *Journal of Organometallic Chem.* 209 (1981) 69-76.

*Chem. Abstracts*, vol. 53, 13674i (1959).

*Primary Examiner*—Patrick P. Garvin
*Attorney, Agent, or Firm*—French and Doescher

[57] ABSTRACT

A vanadium dichloride-ether complex is carried on a porous support. This complex can be produced by either forming $VCl_2$ and thereafter complexing the material with an ether or forming an ether complex with $VCl_4$ or $VCl_3$ and thereafter reducing the vanadium compound to $VCl_2$. It is also possible to carry out the complexing reaction and the reduction essentially simultaneously. The resulting catalyst in combination with a cocatalyst is capable of giving high activity in olefin polymerization and demonstrates good sensitivity to molecular weight control agents, thus allowing the production of a broad spectrum of polymers so far as molecular weight is concerned.

38 Claims, No Drawings

SUPPORTED VANADIUM DIHALIDE-ETHER COMPLEX CATALYST

CROSS-REFERENCE TO RELATED APPLICATION

This is a continuation-in-part of copending application Ser. No. 488,887, filed Apr. 26, 1983 and now abandoned.

BACKGROUND OF THE INVENTION

This invention relates to supported vanadium catalysts for olefin polymerization.

Vanadium compounds display catalytic activity in a number of diverse chemical reactions. Since vanadium is closely related to both chromium and titanium in the Periodic Table, it is only natural that it has been tried in place of chromium or titanium as a catalyst for the polymerization of mono-1-olefins, such as ethylene. Peters et al, U.S. Pat. No. 3,371,079 discloses silica supported vanadium pentoxide with a cocatalyst for polymerizing ethylene. Kearby, U.S. Pat. No. 3,271,299 discloses aluminum phosphate-supported vanadium pentoxide as a hydrogenation catalyst and suggests aluminum phosphate as a support for chromium or molybdenum for polymerizing ethylene and propylene. However, vanadium catalysts have not been as commercially successful as titanium or chromium catalysts for olefin polymerization. Supported vanadium catalysts have been particularly disappointing. The closest vanadium has come to being commercially viable as an olefin polymerization catalyst has been in systems more analogous to unsupported titanium systems, i.e., $VOCl_3$, $VCl_4$ or $VCl_3$ used with a reducing agent such as an aluminum hydride. However, the natural tendency of vanadium to catalyze reactions other than polymerization has been a constant problem limiting its usefulness in olefin polymerization. Yamaguchi et al, U.S. Pat. No. 4,202,958 and Natta et al, U.S. Pat. No. 3,260,708 disclose unsupported vanadium halide-ether complexes as catalysts, but such unsupported systems tend to cause reactor plugging.

It would be desirable for some applications to produce polymer having different characteristics from that produced with the chromium systems, such as for instance, polymer with a different particle shape. Also, it would be desirable to be able to obtain in non titanium systems the molecular weight sensitivity to hydrogen displayed by titanium catalyst systems.

SUMMARY OF THE INVENTION

It is an object of this invention to provide a vanadium catalyst capable of operating without reactor fouling;

It is a further object of this invention to provide a vanadium catalyst capable of giving high activity;

It is yet a further object of this invention to provide a catalyst system capable of giving ultra high molecular weight polymer;

It is a further object of this invention to produce the novel compounds $VCl_2.ZnCl_2.2THF$ and $VCl_2.ZnCl_2.4THF$;

It is a further object of this invention to provide a novel, highly active vanadium catalyst; and It is a further object of this invention to provide a catalyst having outstanding sensitivity to molecular weight control agents such as hydrogen at high activity rates.

In accordance with one aspect of this invention, a vanadium dihalide-ether complex is carried on a porous support. In accordance with another aspect of this invention $VCl_2.ZnCl_2.4THF$ is prepared and dissolved in a chlorinated hydrocarbon.

DESCRIPTION OF THE PREFERRED EMBODIMENTS

There are two routes to obtaining the supported vanadium dihalide-ether complex of this invention. These are:

(1) Form $VX_2$ and thereafter complex this material with an ether.

(2) Form an ether complex with $VX_4$ or $VX_3$ and thereafter reduce the vanadium compound to $VX_2$.

There are certain advantages to each of the two methods set out hereinabove but in each instance, the resulting catalyst is a truly remarkable material capable of overcoming the disadvantages historically associated with vanadium catalysts. The following describes in greater detail the two methods set out hereinabove for achieving the catalyst of this invention. Since the preferred halide is chloride, the following description assumes X to be chlorine, but fluorides, bromides, and iodides, particularly bromides can also be used in each instance where chloride is indicated.

The first route is briefly described as involving the formation of $VCl_2$ and thereafter complexing with an ether. Since $VCl_2$ is difficult to form, requiring reactions at 500° C. or above and since $VCl_2$ does not appear to react directly with common ethers to form a complex, the adduct must be prepared from an intermediate such as a $VCl_2$-alcohol complex which can be obtained by electrolytic reduction of $VCl_3$ in alcohol. For instance, $VCl_2.2CH_3OH$ can be produced by electrolytic reduction of $VCl_3$ in methanol as is known in the art. This is shown in J. H. Seifert, and T. Auel, Journal of Inorganic and Nuclear Chemistry, 30, 2081–2086 (1968), the disclosure of which is hereby incorporated by reference. The resulting $VCl_2$-alcohol complex can then be reacted with an ether to form the ether complex. For instance, with THF the resulting vanadium dihalide-ether complex is $VCl_2.2THF$. Herein THF is used as the abbreviation for tetrahydrofuran. J. H. Seifert and T. Auel also disclose preparation of $VBr_2.2CH_3OH$ in Z. Anorg. Allg. Chem., 360, 50–61 (1968), the disclosure of which is hereby incorporated by reference. By these means, $VX_2$.ether is produced as described below.

Suitable ethers are 1,3-dioxane and those ethers of the general formula $R—(OCH_2CH_2)_nOR'$ where R and R' are the same or different and represent hydrocarbon groups with 1 to 12 carbon atoms and n is 0 or 1. The R and R' groups may be bonded together to form a ring. Exemplary compounds include aliphatic ethers such as diethyl ether, diisopropyl ether, di-n-propyl ether, isopropyl ethyl ether, di-n-butyl ether, ethyl n-butyl ether, di-n-amyl ether, di-n-octyl ether, di-n-decyl ether and di-n-dodecyl ether. Suitable cyclic ethers include tetrahydrofuran (THF) and tetrahydropyran with THF being preferred. The ether and the alcohol adduct can be reacted by contacting the methanol complex with excess ether at ambient temperature to slightly above, although temperatures of 0° C. to about 50° C. can be used.

The second and presently preferred route for producing the vanadium dichloride-ether complex is to form a vanadium tetrachloride- or vanadium trichloride-ether complex and thereafter to reduce the vanadium of the complex to VCl$_2$. In this embodiment, the ether is selected from the ethers described hereinabove except that it must be cyclic. Again, the preferred ether is tetrahydrofuran. The reason for this is that when straight chain ethers are reacted with VCl$_4$ which is then reduced, a complex is formed with vanadium in the +3 state which is difficult to further reduce.

The starting material for forming the complex can be either VCl$_4$ or VCl$_3$, both of which are commercially available materials.

The formation of the complex can be achieved simply by contacting the ether with the vanadium tetrachloride or vanadium trichloride at room temperature. If desired an elevated or reduced temperature can be used, i.e., from −100° to 200° C. but this is not necessary in view of the suitability of room temperature. Alternatively, a solvent can be utilized. Suitable solvents include hexane, heptane, cyclohexane, benzene, toluene, dichloromethane, chloroform and carbon tetrachloride. An inert solvent including a mixture of halogenated and aromatic components may offer a slight advantage over other solvents. A catalytic agent may be utilized to speed up the reaction forming the complex. Suitable catalysts include elemental zinc, elemental magnesium, sodium borohydride and sodium hydride, preferably sodium hydride. With VCl$_4$ lower temperatures are preferred than with VCl$_3$. Most preferred with VCl$_4$ is a temperature of 0° to 20° C. with no solvent. If a solvent is used with VCl$_4$ higher temperatures can be used (because the solvent will carry away some of the heat from the exothermic reaction) but are not necessary. With VCl$_3$ it is also preferred not to use a solvent but slightly higher temperatures are preferred. Operating in ether with no solvent at reflux temperatures (65° C. for THF) is particularly suitable with VCl$_3$ although on a commercial scale it is likely that slightly higher temperatures and a slight pressure would be used sufficient to keep the ether in the liquid state.

After formation of the vanadium tetrachloride or vanadium trichlorie complex with the cyclic ether, the vanadium of the resulting complex is reduced so as to give vanadium dichloride. Some of the reduction can be carried out using any conventional reducing agent such as organoaluminum and organoboron compounds. Examples of such compounds are those of the formula R$_3$Al, R$_2$AlX, RAlX$_2$ and R$_3$B where R is a 1 to 12, preferably 2 to 4 carbon atom hydrocarbyl radical, most preferably ethyl, propyl or butyl and X is chlorine, fluorine or bromine preferably chlorine. However, at least the last part of the reduction is carried out using zinc metal or alkyl zinc compounds of the formula R$_2$Zn where R is as described above. The preferred material is elemental zinc in a fine powdered form. The zinc or zinc compounds are capable of reducing vanadium to the +2 valence and give a vanadium zinc ether complex product that is easily dispersed on the support and which is enhanced by the presence of the support. With VCl$_4$ there seems to be an advantage to stepwise reduction from V$^{+4}$ to V$^{+3}$ to V$^{+2}$.

It is preferred, however, to start with vanadium trichloride rather than vanadium tetrachloride simply because less zinc is required and thus less zinc is left in the final catalyst. The presence of the zinc has a detrimental effect on the activity and hence the preference for the vanadium trichloride as the starting material.

These principles can be summarized as follows:

Preparation of 2VCl$_2$.ZnCl$_2$.6THF is best done from VCl$_3$.3THF with ½ gram atom Zn metal or ½ mole Et$_2$Zn (diethylzinc) per gram atom V, preferably at about 90° C.

The VCl$_3$.3THF may be prepared from VCl$_3$+THF and NaH (catalytic amount) or from VCl$_4$ in THF and ⅓Et$_3$B (triethylborane) The Et$_3$B reduction proceeds more rapidly with heating to ≃80° C.

Thus, vanadium trichloride when extracted with tetrahydrofuran in the presence of sodium hydride yields VCl$_3$.3THF. This red-orange compound may be further reduced to a green compound of the formula 2VCl$_2$.ZnCl$_2$.6THF. This is accomplished with the reducing agents disclosed hereinabove. Broadly, reaction conditions when starting with VCl$_3$ are as follows: Anhydrous VCl$_3$ and a catalytic amount of catalyst such as sodium hydride (<0.1 mol %) are refluxed several hours in THF until a burgundy red solution is obtained. Without isolating VCl$_3$.3THF, one half equivalent of Zn dust is added and refluxing continued for an additional hour. After cooling to room temperature, 2VCl$_2$.ZnCl$_2$.6THF is observed as a green, microcrystalline mass in the bottom of the reactor vessel. The reaction solvent is decanted and the product washed once, with cold THF and once with pentane, then dried under vacuum at room temperature. As with the formation of the complex, the reduction in a commercial scale operation will advantageously be carried out at a temperature slightly above reflux and under slight pressure.

Thus temperatures of 20° to 130° C. and pressures ranging from atmospheric to 100 psig can be used so as to maintain the ether in liquid condition. Generally, conditions are chosen so that only moderate pressure is required. Times are generally from 15 minutes to two hours or more. With VCl$_4$ the ether brings about a reduction to VCl$_3$ at higher temperatures. This offers both advantages and disadvantages. Operating at lower temperatures is more simple because the amount of reducing agent can be determined precisely. If some unknown amount of reduction occurs at the high temperature, this makes it more difficult to calculate the reducing agent (such as zinc metal or organozinc compounds) needed to go to V$^{+2}$ but under these circumstances less zinc is in the final catalyst which is good.

When VCl$_4$ is used as a starting material, the situation is thus somewhat more involved than with VCl$_3$. A complex between VCl$_4$ and the ether, such as THF of the formula VCl$_4$.2THF, may be prepared by reaction in a solvent such as hexane, heptane, cyclohexane, benzene, toluene, dichloromethane, chloroform, and carbon tetrachloride. Aromatic and halogenated solvents may be preferred. Alternatively, the ether may be the only solvent thus eliminating the step of solvent removal. In the reduction of VCl$_4$.2THF with zinc metal or a zinc compound such as diethylzinc, the Zn/V atom ratio determines the product mix. Thus, for Zn/V atom ratio=0.5, the major product is VCl$_3$.ZnCl$_2$.5THF with some VCl$_3$.3THF. For Zn/V atom ratio=1.0, the major product is VCl$_2$.ZnCl$_2$.4THF but also some of the same compounds formed at the lower ratio are also produced here. The VCl$_2$.ZnCl$_2$.4THF is a novel compound and can be separated as a product of the process by crystallization as the product mix is cooled or concentrated. The structural formula was determined to be:

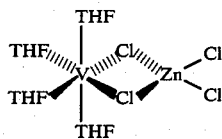

which can also be written (THF)$_4$V($\mu$-Cl)$_2$ZnCl$_2$. Thus Zn/V ratios in the catalyst can vary from zero to 1 in the final product, generally 0.1 to 1, more generally 0.5 to 1. The ratio of Zn to V used to make the product can vary from 0.5:1 or less to 2:1 or more but generally will be in the 0.5:1 to 1:1 range. The structural formula and atom ratios shown here for the final product are composite or average figures and the exact compound shown may or may not exist in any great quantity. This is true when using either Zn metal or Et$_2$Zn. Cooling the reduction mixture evidently favors V$^{+3}$ over V$^{+2}$. By using $\frac{1}{3}$ mole of a reducing agent such as triethylborane, VCl$_4$.2THF may be reduced at room temperature over several days time or at 80° C. for one hour to the red-orange VCl$_3$.3THF. Instead of the organoboron reducing agent, an organoaluminum reducing agent as defined above may be used. The products of reactions using a zinc component as the sole reducing agent consist of a mixture of three compounds with the formulae VCl$_3$.ZnCl$_2$.5THF, VCl$_2$.ZnCl$_2$.4THF and VCl$_3$.3THF which are light green, aqua and red-orange in color, respectively. The relative proportion of these products depends upon the amount of reducing agent such as zinc and the reaction conditions chosen. For instance, higher zinc levels, Zn/V atom ratio=1 favor the VCl$_2$ compound while lower zinc levels, Zn/V atom ratio=0.5 favor the VCl$_3$ products. Cooling the mixture seems to stop the reduction at VCl$_3$; as in the zinc reduction of VCl$_3$.3THF, reduction to V+2 occurs slowly at temperatures below 60° C. as determined by visual observation of the color change. Thus when the starting material is VCl$_4$, preferably at least a part of the reaction is carried out at a temperature of at least 60° C., preferably 65° to 130° C., most preferably 65° C. to 100° C.

The VCl$_2$ZnCl$_2$.4THF can be dissolved in a chlorinated hydrocarbon solvent and on standing VCl$_2$ZnCl$_2$.2THF precipitates, this material also being a novel compound. This precipitation can be speeded up by gentle heating. For instance, if dichloromethane is the solvent, heating at 100° C. under pressure to maintain liquid conditions gives a 78 percent yield in 15 minutes. Other suitable solvents are halogenated hydrocarbons, particularly chlorinated and dichlorinated hydrocarbons such as ethyl chloride, and 1,2-dichloroethane. Also suitable is CCl$_2$FCCl$_2$F or CCl$_2$FCClF$_2$. Generally heating at 50° to 100° C. will be used.

The catalyst is preferably formed and thereafter combined with the support, although it is possible to first combine the support with the ingredients and thereafter carry out the complexing and/or reducing reactions. Reduction after combination with the support would preferably be carried out using a hydrocarbon soluble reducing agent such as a dialkyl zinc compound, i.e. a solid reducing agent which is not soluble could not be used.

In some instances, it may be desirable to carry out the reduction and the formation of the ether complex essentially simultaneously. This is accomplished by simply combining the reducing agent as defined above in ether with VCl$_3$ or VCl$_4$. The formation of the vanadium complex from VCl$_3$ and ether may be accelerated by the presence of a catalytic agent such as sodium hydride, the same as in the first route. Alternatively, the starting material can be VCl$_4$ and the presence of an adequate (stoichiometric) amount of reducing agent such as triethylborane to bring the vanadium to the +3 oxidation state alone or with the principal reducing agent to give VCl$_3$ and ultimately VCl$_2$. In this case, R$_2$Zn is not suitable as the principal reducing agent because of the following reactions

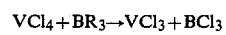
VCl$_4$+BR$_3$→VCl$_3$+BCl$_3$

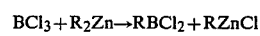
BCl$_3$+R$_2$Zn→RBCl$_2$+RZnCl

The second reaction which is not desirable does not occur with zinc metal.

The simultaneous complex formation and reduction reaction is carried out at a temperature of 20° to 130° C. with 70° to 100° C. preferred and at atmospheric to moderate pressure to maintain the ether as a liquid. The reagents must be added slowly or incrementally with adequate time for stepwise reduction to occur. Reduction with triethylborane at room temperature takes several days, while at 90° C. the reaction is complete in one hour.

The support can be any porous support conventionally utilized in catalytic reactions. However, the presence of a support is absolutely essential since the unsupported material, while active as a catalyst, is of no practical utility because it causes reactor fouling. Suitable supports include catalytic grade silica such as Davison 952 MS, alumina such as Ketjen Grade B, magnesium oxide, aluminum phosphate or phosphated alumina. Aluminum phosphate having a phosphorus to aluminum ratio of about 0.6:1 to 0.9:1 and phosphated alumina prepared by treating alumina with a phosphating agent such as orthophosphoric acid can also be used. Generally, the phosphorus to aluminum ratio on the surface will be within the range of 0.1:1 to 1:1, preferably 0.2:1 to 0.9:1. Suitable phosphorus-containing bases are disclosed in detail in McDaniel et al, U.S. Pat. No. 4,364,841 (Dec. 21, 1982), the disclosure of which is hereby incorporated by reference.

The support is generally calcined or otherwise treated generally in an oxygen-containing ambient such as air at an elevated temperature to dry and/or activate same as is well known in the art before being treated with catalyst. Generally activation temperatures of 150°–800° C., preferably 400°–600° C. are utilized with the aluminum phosphate bases. Silica, alumina and phosphated alumina bases generally are activated at a temperature of 450°–1000° C. Subsequent to the activation, the base and the catalyst are combined. By porous base is meant a substrate having a surface area within the range of 100 to 600, preferably 300 to 500 square meters per gram.

The vanadium complex catalyst is incorporated in the support preferably in an amount where the support is saturated. With alumina this is about 3 weight percent vanadium based on the weight of the support with activity falling off at 1 percent or less. Broadly 0.1 to 10, preferably 0.5 to 3 weight percent is used.

The vanadium complex catalyst component and the support can be combined in any suitable manner which assures dispersal of the catalyst component on the surface of the support. Generally this will be done by forming a slurry of the catalyst component and the support in a solvent for the catalyst component, and separating the thus impregnated supported catalyst from excess solution. Preferred solvents are polar non-protic normally liquid materials such as dichloromethane or chloroform, preferably dichloromethane. This can be done by filtering and then washing with the solvent and optionally thereafter with a hydrocarbon such as pentane, hexane, heptane or any normally liquid volatile aliphatic hydrocarbon. The slurry can be formed by first dissolving the vanadium complex and slurrying with the silica or by mixing the solids and then adding solvent. Any inert liquid, which will dissolve the vanadium complex can be used with methylene chloride being particularly suitable. Remaining solvent after the wash step can be removed under gentle conditions and in an inert atmosphere such as vacuum or a flowing nitrogen or argon stream. Room temperature up to 50° C. is suitable. Optionally, it can be left as a slurry in the hydrocarbon wash liquid.

The catalysts of this invention can be used to polymerize at least one mono-1-olefin containing 2 to 8 carbon atoms per molecule. The catalysts will also catalyze other reactions as is well known with vanadium catalysts but one of the advantages of this invention is that the catalysts are effective in producing olefin polymer without undesirable side reactions. The catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. If it is the object to produce a copolymer, 0.5 to 20 mole percent comonomer or more can be used, enough to give 0.4 to 3 weight percent incorporation of comonomer being preferred.

These polymers can be produced by solution polymerization or slurry polymerization using conventional equipment and contacting processes. Contacting of the monomer or monomers with the catalyst can be effected in any manner known in the art of solid catalysts. One convenient method is to suspend the catalyst in an organic medium and to agitate the mixture to maintain the catalyst in suspension throughout the polymerization process.

The catalyst of this invention is particularly suitable for these slurry polymerization systems and is capable of giving a complete spectrum of polymer so far as melt flow is concerned, including ultra high molecular weight polymer, utilizing a single catalyst.

While hydrogen is known as a molecular weight control agent, the catalysts of this invention display an extraordinary sensitivity to hydrogen so that by controlling the amount of hydrogen utilized everything from ultra high molecular weight polymer through polymers of molding or even injection molding grade can be produced.

When hydrogen is used in the prior art, it is generally used at partial pressures up to 120 psia (0.8 MPa), preferably within the range of 20 to 100 psia (0.14 to 0.69 MPa). These same amounts of hydrogen can also be used in this invention, although because of the high sensitivity to hydrogen, it may be preferred in the present invention to use 5 to 20 psia when relatively high molecular weight polymer is desired.

When hydrogen is utilized it does tend to reduce activity and in such instances, it is desirable to use an adjuvant (activator). Suitable adjuvants include dibromomethane, bromochloromethane, dichloromethane, 1,1,3-trichlorotrifluoromethane, 1,2-dichlorotetrafluoroethane and dichlorodifluoromethane. A particularly suitable material is 1,2-difluorotetrachloroethane. Of course these adjuvants can be used in the absence of hydrogen but their use is not necessary generally because of the extraordinarily high activity of the catalyst. The activator is generally used in an amount within the range of 1 to 5000 ppm based on the solvent in the polymerization zone, different ranges apply to different activators. With $CFCl_2CFCl_2$, 20 to 500 ppm is preferred.

With slurry polymerization of ethylene and predominantly ethylene copolymer systems, the preferred temperature range is generally about 200°–230° F. (93°–110° C.) although 66°–110° C. can be used. The catalysts of this invention do not have any undesirable induction time between the initial contact with the monomer and the initiation of polymerization.

Suitable polymerization solvents or diluents include straight chain and cyclic hydrocarbons such as normal pentane, normal hexane, cyclohexane and other conventional polymerization solvents.

The catalysts of this invention are used in conjunction with a cocatalyst. The cocatalyst is an organometal compound including organoboron compounds. Suitable compounds include (1) organoaluminum compounds of the formula $R_mAlX_{3-m}$ where R is a hydrocarbon group of 1 to 12 carbon atoms, X is hydrogen or a halogen atom or an alkoxy group, and m is 1–3 inclusive, (2) organoboron compounds of the formula $R_3B$ where R is as defined above, and (3) organomagnesium compounds of the formula $R_2Mg$ where R is as defined above, with 2 to 6 carbon atom dialkyl magnesium compounds being preferred. The preferred cocatalysts are alkylaluminum compounds of the above formula wherein R is a 2 to 4 carbon atom alkyl radical, most preferably triethylaluminum.

The cocatalyst is utilized in an amount so as to give an atom ratio of metal or boron to vanadium within the range of 1000:1 to 1:1, preferably 200:1 to 10:1. Based on the solvent in the polymerization zone, the amount of metal compound cocatalyst is generally within the range of 1000 to 1, preferably 500 to 10 parts by weight per million parts by weight of the solvent or diluent, these amounts being based on the total reactor contents when no solvent or diluent is used. The cocatalyst can be premixed with the catalyst or added as a separate stream or both.

EXAMPLE 1—CATALYST PREPARATION (UNSUPPORTED)

A. Comparison Catalysts

1. $VCL_3.3THF$ (THF is tetrahydroduran)

A mixture of zinc dust, 1.58 g (24.1 mmoles) and $VCl_4.2THF$, 16.26 g (48.2 mmoles) was placed in a glass pressure bottle in a glove box and while cooling in a ice bath, 50 mL (425 mmoles) of THF was added resulting in a vigorous reaction and formation of a red slurry. The reaction mixture was warmed to about 25° C. and then heated for one hour at 80° C. After cooling overnight, the mixture was filtered yielding red and green solids weighing 18.7 g. The crude product was slurried in 150 mL of THF, heated to reflux and filtered. The filtrate was concentrated slightly resulting in the formation of red crystals which were collected and weighed 2.76 g. Analysis indicated the product to be $VCl_3.3THF$. Atom ratio: $V^{+4}/Zn° = 2$.

2. VCl$_3$.ZnCl$_2$.5THF

A three-neck flask fitted with a condenser was charged with 16.5 g (49.0 mmoles) of VCl$_4$.2THF and THF to form a suspension. The mixture was heated to reflux and 3.20 g (49.0 mmoles) of zinc dust was slowly added resulting in a vigorous reaction. The reaction mixture refluxed for one hour and filtered hot. A light blue solid was collected, which analysis subsequently showed to be VCl$_2$.ZnCl$_2$.4THF (also in supported form invention catalyst 2) and a light green solid slowly crystallized in the filtrate. The green solid was collected, washed with THF and dried under vacuum and found to weigh 5.81 g. Analysis subsequently indicated the green product to be VCl$_3$.ZnCl$_2$.5THF. Atom ratio: V$^{+4}$/Zn$^\circ$ = 1.

B. Invention Catalysts

1. 2VCl$_2$.ZnCl$_2$.6THF

A glass pressure bottle placed in a glove box (dry box) was charged with 10.0 g (26.8 mmoles) of VCl$_3$.3THF, 0.88 g (13.4 mmoles) of zinc dust and 40 mL (340 mmoles) of THF. The bottle was then placed in an oil bath at 90° C. for 30 minutes and then cooled yielding a forest (grass) green crystalline solid. The solid was recovered and dried under a vacuum. Analysis indicated the product to be 2VCl$_2$.ZnCl$_2$.6THF. Atom ratio: V$^{+3}$/Zn$^\circ$ = 2. Thus this compound is produced by contacting VCl$_3$.3THF in THF with about one-half mole of zinc or an alkyl zinc compound.

2. VCl$_2$.ZnCl$_2$.4THF

Described earlier under comparison catalyst 2.

3. VCl$_2$.ZnCl$_2$.4THF

A glass pressure bottle was charged with 18.14 g (53.8 mmoles) of VCl$_4$.2THF, 3.52 g (53.8 mmoles) of zinc dust and 50 mL (425 mmoles) of THF was added. A vigorous reaction occurred following which the bottle and reaction mixture were heated for one hour at 70° C. A tan-colored solid was filtered off in a glove box and washed with THF leaving a pale green solid. A portion of the solid, 15.95 g, was extracted in a soxhlet with 200 mL of THF. An aqua-colored, crystalline solid weighing 4.1 g was isolated from the extract. Analysis indicated the product to be VCl$_2$.ZnCl$_2$.4THF. Atom ratio: V$^{+4}$/Zn$^\circ$ = 1.

Any or all of the previous catalysts can be supported individually on a support as described earlier in the specification. For example, 1 g of Ketjen Grade B alumina, previously calcined at 600° C., was added to a schlenk tube under argon with 0.40 g of invention catalyst 1, 2VCl$_2$.ZnCl$_2$.6THF. The tube was shaken to mix the contents, 20 mL of methylene chloride was added and the mixture was stirred briefly. The tube was transferred to a glove box and the colorless supernatant liquid removed by filtration. the product was washed several times with 20 mL portions of fresh methylene chloride and then dried by gentle heating in a nitrogen stream to yield a pale green catalyst. Since the impregnated catalyst retained the color of the divalent vanadium compound employed, it is believed that impregnation, per se, does not alter the valence state of the vanadium.

EXAMPLE 2—Ethylene Polymerization With Unsupported Catalysts

Ethylene was polymerized in a 1 gallon (3.8 L) stirred, stainless steel reactor at 100° C. for 1 hour using 2 L of isobutane as diluent, 2.0 mmoles of 1,2-difluorotetrachloroethane (CFCl$_2$CFCl$_2$), when employed as an exemplary halocarbon activator, 1.0 mmole of triethylaluminum (TEA) dissolved in n-heptane as cocatalyst, unless specified otherwise, and 80 psi (0.55 MPa) of hydrogen, when employed. In each run, the diluent, cocatalyst, CFCl$_2$CFCl$_2$, if employed, catalyst and hydrogen, if employed, were charged to the dry, clean reactor at about 20° C. The temperature was then raised to 100° C. and sufficient ethylene was charged to obtain a differential pressure of 230 psi (1.6 MPa) and the run was started. The total reactor pressure in the runs ranged from about 505 to 555 psia (3.5 to 3.8 MPa) as shown and it was maintained at the desired pressure by additional ethylene from a pressurized reservoir as needed.

In the various runs, the atom ratio of aluminum in the TEA to the vanadium contained in the catalyst ranged from a low of about 17:1, to a high of about 102:1, but mostly from about 17:1 to about 70:1. The weight of TEA per 1,000,000 parts isobutane diluent ranged from about 50 ppm TEA in Run 1 to about 100 ppm TEA in Runs 2–14. The differences in the amounts of TEA employed over the above ranges are deemed to be not critical in evaluating the polymerization results.

Each polyethylene recovered from the reactor was dried, weighed to ascertain the yield and the melt index determined in accordance with ASTM D 1238-65, Condition E (MI) and Condition F (HLMI).

The results are set forth in Table I.

TABLE I

| | | Unsupported Catalysts | | | | | |
|---|---|---|---|---|---|---|---|
| Comparison | Run No. | Catalyst Compound | Wt. g | Productivity g PE/g cat/hr | H$_2$[a] psi | Employed CFCl$_2$CFCl$_2$ | MI | HLMI |
| " | 1 | VCl$_3$.3THF | 0.0411 | 1,000 | 0 | No | 0[b] | 0 |
| " | 2 | VCl$_3$.3THF | 0.0142 | 3,310 | 0 | Yes | 0 | 0 |
| " | 3 | VCl$_3$.3THF | 0.0209 | 23,800 | 80 | Yes | 1.3 | 51 |
| " | 4 | VCl$_3$.ZnCl$_2$.5THF | 0.0064 | 2,660 | 0 | Yes | 0 | 0 |
| " | 5 | VCl$_3$.ZnCl$_2$.5THF | 0.0138 | 4,640 | 80 | Yes | 1.6 | 61 |
| " | 6 | 2VCl$_2$.ZnCl$_2$.6THF | 0.0155 | 23,700 | 0 | Yes | 0 | 0 |
| " | 7 | 2VCl$_2$.ZnCl$_2$.6THF | 0.0214 | 31,100 | 80 | Yes | 0 | 0 |
| " | 8 | 2VCl$_2$.ZnCl$_2$.6THF | 0.0036 | 34,800 | 80 | Yes | 2.1 | 95 |
| " | 9 | VCl$_2$.ZnCl$_2$.4THF | 0.0317 | 725 | 80 | No | 2.2 | 131 |
| " | 10 | VCl$_2$.ZnCl$_2$.4THF | 0.0281 | 24,000 | 80 | Yes | 1.0 | 119 |
| " | 11 | VCl$_2$.ZnCl$_2$.4THF | 0.0080 | 15,300 | 80 | Yes | 6.8 | 190 |
| " | 12 | VCl$_2$.ZnCl$_2$.2THF | 0.0179 | 400 | 80 | No | 5.5 | 192 |
| " | 13 | VCl$_2$.ZnCl$_2$.2THF | 0.0097 | 31,300 | 80 | Yes | 1.1 | 52 |

[a]Hydrogen was measured as the pressure drop from a 0.325 L vessel.
[b]This run used 0.5 mmole of TEA.

All of the catalysts employed in Table I caused reactor fouling when run with or without $CFCl_2CFCl_2$ as an activator and/or with or without hydrogen to regulate molecular weight of the polymer. In Run 3, using comparison catalyst 1 ($VCl_3.3THF$) and in Runs 6, 7, 8, 10, 11 and 13 using the invention catalysts, good productivities are obtained when the activator is present. The catalysts containing divalent vanadium appear to be slightly more active than the trivalent vanadium contained in the comparison catalysts.

EXAMPLE 3—Ethylene Polymerization With Vanadium Compounds Supported On Alumina Ketjen Grade B alumina, a commercial material having a pore volume of about 1.7 cc/g and a surface area of about 320 m²/g, was employed as the support in this example. Before contacting with the vanadium compound, in a typical activation process, 50 g of the support were fluidized with air in a quartz tube at 600° C. for 3 hours. After cooling to 400° C., the air stream was supplanted with dry nitrogen and the sample was allowed to cool to about 25° C. It was then stored under nitrogen in a sealed flask.

The supported catalysts in a typical preparation were prepared by contacting 1.0 g of the calcined alumina and 10 mL of methylene chloride in a schlenk tube under argon and to it was added about 0.3 g of the vanadium compound and the mixture was mixed well by shaking. The impregnated catalyst was recovered in a glove box by filtration and washed several times with 20 mL of fresh methylene chloride.

In preparing the supported catalysts, sufficient vanadium-containing mixture was used to insure that the support was saturated. The final product was dried by gentle heating under a nitrogen stream. Plasma emission analysis of the catalysts showed them to contain from about 2 to 3 weight percent vanadium. The impregnated catalysts retained the colors of the vanadium compounds used in preparing them.

Ethylene was polymerized in one hour runs at 100° C. with the supported catalysts in the reactor described in Example 2. In each instance, 2 L of isobutane was used as diluent, 1.0 mmole of TEA was employed as cocatalyst, 2.0 mmoles of $CFCl_2CFCl_2$ as activator, 80 psi hydrogen, if employed, and an ethylene differential pressure of 230 psi.

The total reactor pressure in the runs varied from 515 to 535 psia (3.6 to 3.7 MPa).

The results obtained and the melt index values determined for the various polymers are given in Table II.

The Al/V atom ratio in these runs varies from about 15 to 109, assuming each supported catalyst contains 3 weight percent vanadium. For 2 weight percent vanadium, the Al/V atom ratios vary from about 22 to 164.

The results in Table II show that the addition of hydrogen significantly depresses catalyst activities of the vanadium compounds supported on alumina. The influence of catalyst support on activity is disclosed in more detail in Example 4.

A comparison of similar runs for each vanadium oxidation state indicates that increasing the zinc content of the catalyst results in a lowering of catalyst activity. For example, with trivalent vanadium as in Run 1, in the absence of hydrogen and the absence of zinc, the catalyst productivity is 9,490 g PE/g catalyst/hour. In Run 3, in the absence of hydrogen with the trivalent vanadium compound containing a calculated Zn content of about 10 weight percent, and an atom ratio of V/Zn of 1, the catalyst productivity is 2,520 g PE/g catalyst/hour. With divalent vanadium, a similar trend is observed in comparing the productivity figure of Run 5, 40,500 g PE/g catalyst/hour, with that of Run 7, 8,740 g PE/g catalyst/hour, or with Run 8, 10,200 g PE/g catalyst/hour. The Run 5 catalyst contains a calculated Zn content of about 8.8 weight percent with an atom ratio of V/Zn of 2 whereas the Run 7 or 8 catalyst contains a calculated Zn content of about 12 weight percent with an atom ratio of V/Zn of 1.

A fairer comparison of the effect of the oxidation state of vanadium on catalyst activity can be obtained by comparing catalysts containing the same V/Zn atom ratio. For example, the trivalent vanadium catalyst used in Run 3 has a calculated V/Zn atom ratio of 1 and produced 2,520 g PE/g catalyst/hour and the divalent vanadium catalysts of Runs 7 or 8 having calculated V/Zn atom ratios of 1, produced 8,740 and 10,200 g PE/g catalyst/hour, respectively, under identical reaction conditions. Also, in comparing the trivalent vanadium catalyst of Runs 1, 2 (no zinc), with the divalent vanadium catalyst of invention Runs 5 and 6 (V/Zn atom ratio of 2), it is apparent that the divalent catalyst is more active.

EXAMPLE 4—Ethylene Polymerization With Vanadium Compounds Supported On Various Substrates The supports used in this Example were selected from commercially obtained materials from the group Ketjen Grade B alumina (disclosed in Example 3), Davison high pore volume alumina having a surface area of 540 m²/g and a pore volume of 2.0 cc/g, and Davison 952 silica having a surface area of 300 m²/g and a pore volume of 1.6 cc/g and an experimental $AlPO_4$, P/Al atom ratio of 0.9, having a surface area of 350 m²/g and

TABLE II

| | | Alumina Supported Catalysts | | | | | |
|---|---|---|---|---|---|---|---|
| | Run | Catalyst | | Productivity | $H_2^{(a)}$ | | |
| Comparison | No. | Compound | Wt. g | g PE/g cat/hr | psi | MI | HLMI |
| " | 1 | $VCl_3.3THF$ | 0.0137 | 9,490 | 0 | 0 | 0 |
| " | 2 | $VCl_3.3THF$ | 0.0803 | 2,590 | 80 | 0.02 | 2.1 |
| " | 3$^{(b)}$ | $VCl_3.ZnCl_2.5THF$ | 0.0238 | 2,520 | 0 | 0 | 0 |
| " | 4$^{(b)}$ | $VCl_3.ZnCl_2.5THF$ | 0.1182 | 948 | 80 | 0.07 | 5.8 |
| Invention | 5 | $2VCl_2.ZnCl_2.6THF$ | 0.0241 | 40,500 | 0 | 0 | 0 |
| " | 6 | $2VCl_2.ZnCl_2.6THF$ | 0.0818 | 3,020 | 80 | 0.92 | 41 |
| " | 7 | $VCl_2.ZnCl_2.4THF$ | 0.0183 | 8,740 | 0 | 0 | 0 |
| " | 8 | $VCl_2.ZnCl_2.4THF$ | 0.0206 | 10,200 | 0 | 0 | 0 |
| " | 9 | $VCl_2.ZnCl_2.4THF$ | 0.0576 | 1,490 | 80 | 0.22 | 11 |
| " | 10 | $VCl_2.ZnCl_2.4THF$ | 0.0936 | 3,020 | 80 | 0.11 | 6 |

$^{(a)}$Hydrogen was measured as the pressure drop from a 0.325 L vessel.
$^{(b)}$Some polymer build-up on reactor walls.

a pore volume of 0.8 cc/g. The phosphated alumina, P/Al$_2$O$_3$, was prepared by treating a previously calcined (600° C.) sample of the Davison alumina with a methanolic solution of H$_3$PO$_4$ at the concentration needed to provide the P/Al atom ratio of 0.1 desired. The excess methanol was removed by suction filtration and the support dried under vacuum at 80° C. for 12 hours.

The catalysts consisting of either 2VCl$_2$.ZnCl$_2$.6THF or VCl$_3$.3THF and the specified support were made by impregnation as previously described.

Ethylene polymerization was carried out in a 2 L stirred, stainless steel reactor containing 1.25 lbs. (about 567 g or 1 L) of isobutane as diluent. Charge order, method of maintaining reactor pressure, which in these runs was about 565 psia (3.9 MPa), and polymer recovery was followed as described before. The weights of catalysts charged, polymerization temperature employed, hydrogen and halocarbon activator used, if any, and polymer results obtained are set forth in Tables IIIA, and IIIB. One mmole of cocatalyst was used in each run, generally TEA, except where diethylaluminum chloride is specified.

show moderately broad to broad molecular weight distribution polymer is made.

The nature of the support also plays an important role in catalyst selection since catalyst productivity and sensitivity to the presence of hydrogen and halocarbon activator are affected by the nature of the support. For example, in considering catalyst productivity and polymer HLMI for Runs 1 to 3 using AlPO$_4$, Al$_2$O$_3$ and SiO$_2$ as supports, the results show using the same divalent vanadium compound, that order of catalyst activity is Al$_2$O$_3$, >AlPO$_4$>SiO$_2$. On the other hand, sensitivity to hydrogen gives the ranking in decreasing order of SiO$_2$, Al$_2$O$_3$ and AlPO$_4$ as supports.

In the absence of hydrogen, the polymers made are high molecular weight in nature having zero HLMI values based on Runs 4–6. Generally, absence of a halocarbon activator also significantly diminishes catalyst activity.

Without an activator, there is no clear preference for the invention catalysts using the vanadium dichloride complex versus the control catalysts using the vanadium trichloride complex, and in some instances the trichloride can even give higher productivity as a comparison of Runs 6 and 7 shows. However, the invention catalysts are far more sensitive to the presence of an activator and the invention catalysts are more sensitive to the presence of hydrogen.

TABLE IIIA

Run Parameters And Results For Supported Vanadium Catalysts

| Run No. | Catalyst V Cpd. | Support | Cat. Wt. g | Productivity g PE/g cat/hr | H$_2$ psi | (CFCl$_2$)$_2$ mmole | HLMI | Density g/cc | Viscosity Intrinsic g/dl | Viscosity Melt M poise |
|---|---|---|---|---|---|---|---|---|---|---|
| 1[a] | A | AlPO$_4$[b] | 0.0428 | 3,620 | 20 | 2.0 | 16[h] | 0.9636 | 2.44 | — |
| 2 | A | Al$_2$O$_3$[c] | 0.0357 | 4,340 | 20 | 2.0 | 38[i] | 0.9651 | 1.78 | — |
| 3 | A | SiO$_2$[d] | 0.0270 | 2,040 | 20 | 2.0 | 113[j] | 0.9687 | —[g] | — |
| 4 | A | Al$_2$O$_3$[e] | 0.0727 | 1,620 | 0 | 0 | 0 | 0.9273 | — | 90 |
| 5 | A | Al$_2$O$_3$[c] | 0.0930 | 1,540 | 0 | 0 | 0 | 0.9294 | — | 95 |
| 6 | A | Al$_2$O$_3$[c] | 0.0681 | 2,470 | 0 | 0 | 0 | 0.9282 | — | 130 |
| 7[f] | B | Al$_2$O$_3$[c] | 0.0374 | 4,810 | 0 | 0 | 0 | 0.9297 | — | 92 |
| 8[f] | B | AlPO$_4$[b] | 0.0458 | 3,100 | 0 | 0 | 0 | 0.9285 | — | 80 |

A is 2VCl$_2$.ZnCl$_2$.6THF.
B is VCl$_3$.3THF (control).
[a] 1 mmole TEA cocatalyst in all runs except 7 and 8.
[b] P/Al atom ratio of 0.9, calcined at 600° C. in air for 3 hours.
[c] Ketjen Grade B alumina calcined at 600° C. in air for 3 hours.
[d] Davison 952 silica calcined at 700° C. in air for 3 hours.
[e] Davison high pore volume alumina calcined at 600° C. in air for 3 hours.
[f] Used 1 mmole diethylaluminum chloride as cocatalyst.
[g] Dash signifies no determination made.
[h] MI = 0.23.
[i] MI = 0.52.
[j] MI = 2.0.

The heterogeneity index (Mw/Mn) as determined from gel permeation chromatography for the Run 1 polymer is 11, Run 2 is 8.7 and Run 3 is 17. These results

TABLE IIIB

Run Parameters And Results For Vanadium-Phosphated Alumina Catalysts

| Run No. | Catalyst (TEA Cocatalyst Unless Ohterwise Noted) V Cpd. | Catalyst Wt. g | Productivity g PE/g Cat/hr | H$_2$ psi | (CFCl$_2$)$_2$ mmole | Polymer Properties HLMI | Density g/cc | Viscosity Intrinsic g/dl | Viscosity Melt M poise |
|---|---|---|---|---|---|---|---|---|---|
| 9 | A | 0.0978 | 3,350 | 0 | 0 | 0 | 0.9285 | — | 119 |
| 10 | A | 0.0237 | 28,000[a] | 0 | 1.0 | 0 | — | — | — |
| 11 | A | 0.0156 | 31,500[b] | 0 | 0.1 | 0 | 0.9284 | — | 134 |
| 12 | A | 0.0357 | 6,330 | 50 | 1.0 | high[e] | 0.9693 | — | — |
| 13 | A | 0.0340 | 3,240 | 50 | 1.0 | high[f] | 0.9688 | — | — |
| 14 | A | 0.0625 | 3,580[c] | 20 | 1.0 | high[g] | 0.9710 | — | — |
| 15 | A | 0.0634 | 7,260[d] | 1 | 1.0 | 0 | 0.9395 | — | 34.5 |
| 16 | A | 0.0294 | 6,730 | 10 | 1.0 | 4.8[h] | — | — | — |
| 17 | A | 0.1040 | 1,970 | 80 | 2.0 | 51[i] | 0.9662 | — | — |
| 18 | A | 0.0201 | 34,200 | 0 | 2.0 | 0 | 0.9253 | 28.6 | — |
| 19 | B | 0.1141 | 3,820 | 80 | 2.0 | 0.6[j] | 0.9555 | — | — |

TABLE IIIB-continued

| | Run Parameters And Results For Vanadium-Phosphated Alumina Catalysts | | | | | | | | |
|---|---|---|---|---|---|---|---|---|---|
| | Catalyst (TEA Cocatalyst Unless Ohterwise Noted) | | | | | Polymer Properties | | | |
| | | | | | | | | Viscosity | |
| Run No. | V Cpd. | Catalyst Wt. g | Productivity g PE/g Cat/hr | $H_2$ psi | $(CFCl_2)_2$ mmole | HLMI | Density g/cc | Intrinsic g/dl | Melt M poise |
| 20 | B | 0.0347 | 17,200 | 0 | 2.0 | 0 | 0.9271 | 29.4 | — |

A is $2VCl_2.ZnCl_2.6THF$.
B is $VCl_3.3THF$.
(a)14,000 productivity for 30 minutes, for 60 minutes assuming linear response calculated productivity equals 14,000 × 60 ÷ 30 = 28,000.
(b)16,800 productivity for 32 minutes, see note (a) for correcting to 60 minutes.
(c)3,700 productivity for 62 minutes, see note (a).
(d)4,730 productivity for 39.1 minutes, see note (a).
(e)MI is 140.
(f)MI is 209.
(g)MI is 15.1.
(h)MI is 0.08.
(i)MI is 1.2.
(j)MI is 0.

The atom ratio of Al (or B)/V employed in the runs set forth in Tables IIIA and IIIB ranged from about 14 to 123, assuming each supported catalyst contains 2 weight percent vanadium. For 3 weight percent vanadium, the corresponding atom ratios range from about 17 to 102.

The results in Tables IIIA and IIIB taken together show that the nature of the support has a marked effect on the hydrogen sensitivity of the divalent vanadium catalysts employing the support. For example, comparing the 0.52 melt index of the Run 2, Table IIIA polymer with the melt index of 15 obtained with the polymer of Run 14 of Table IIIB in which a phosphated alumina, P/Al atom ratio of 0.1, is employed in preparing the catalyst, clearly shows the advantage for the vanadium/phosphated alumina combination.

In the absence of reactor hydrogen and halocarbon activator, phosphated alumina, vanadium halide catalysts show reasonably good activity, e.g., 3,350 g PE/g catalyst/hour, and ultrahigh molecular weight polyethylene (UHMWPE) having densities about 0.928 g/cc as shown in Run 9, is produced.

In the absence of reactor hydrogen but addition of from 0.1 to 2 mmoles of a halocarbon activator such as $CFCl_2CFCl_2$, Runs 10, 11 and 18 demonstrate that catalyst activity is substantially increased, e.g., about 8 to 10 fold based on Run 9, while UHMWPE is produced having densities of about 0.928 g/cc.

In the presence of 1.0 mmole $CFCl_2CFCl_2$ and hydrogen varying from 1 to 50 psi, Runs 12–16 demonstrate that a spectrum of polyethylenes can be prepared ranging from UHMWPE at 1 psi hydrogen in Run 15 to low molecular weight polymer having a melt index of 209 in Run 13. Run 15 also shows that a small amount of hydrogen in the reactor along with 1.0 mmole halocarbon significantly increases the polymer density, e.g., from about 0.928 g/cc in absence of hydrogen and halocarbon (Run 9) to about 0.940 g/cc, yet UHMWPE is the product.

In comparing invention Run 17 with control Run 19 of Table IIIB, both run in the presence of 80 psi hydrogen and 2.0 mmoles activator, it is apparent that the invention catalyst is much more sensitive to hydrogen since the polymer made has a HLMI of 51 vs. 0.6 for Run 19 polymer. Under the conditions employed, however, the invention divalent vanadium catalyst has about one-half the activity of the control trivalent vanadium catalyst based on productivities.

In the absence of reactor hydrogen but in the presence of 2.0 mmole activator, the invention divalent vanadium catalyst in Run 18 has about twice the activity of the control trivalent vanadium catalyst used in Run 20. Both catalysts produced UHMWPE of approximately similar molecular weights. However, the polymer made with the invention catalyst has a slightly lower density, 0.925 g/cc vs. 0.927 g/cc.

Melt viscosity data are obtained by means of a Rheometrics Dynamic Spectrometer (RDS) at 230° C. using parallel plate geometry. Strain amplitude is 5%, nitrogen gas is used in the sample chamber and the oscillatory frequency is varied from 0.1 to 500 radian/second. The data obtained give storage modulus and loss modulus as a function of oscillatory frequency. From these data in turn can be calculated dynamic complex viscosity $/\eta*/$ as described in Chapter 1 of the "Viscoelastic Properties of Polymers", by Ferry, published in 1961 by Wiley. The values obtained are directly related to polymer molecular weight. The higher the value the higher the molecular weight. It has been shown for a commercially available UHMWPE that $/\eta*/$ when determined at 0.1 radian/second and 190° C. has a value of about 30M Poise. Higher values then indicate even higher molecular weight polymer. The values obtained in Runs 4–8 of Table IIIA and Runs 9, 11 and 15 of Table IIIB are indicative that UHMWPE has been prepared. The polymer of Run 15, Table IIIB has about the same value as that of a commercially obtained UHMWPE (identified as Hostalen GUR, American Hoechst).

Intrinsic viscosities are determined in accordance with ASTM D 4021-81, modified by using 0.015 weight percent dissolved polymer rather than 0.05 weight percent. The change is made to obtain better dissolution of the UHMWPE samples, which can be difficult to dissolve. Currently, UHMWPE is defined as one having an intrinsic viscosity of about 20 or higher. The polymers of Runs 18 and 20 of Table IIIB give intrinsic viscosities of 28.6 and 29.4, respectively.

In summary, the polymers made in invention Runs 4–6 of Table IIIA and invention runs 9–11, 15 and 18 of Table IIIB can all be characterized as UHMWPE.

EXAMPLE V

In this series of experiments, vanadium tetrachloride was reacted with various ethers, thereafter reacted with TEB and finally contacted with zinc metal.

In the first run, the ether was the cyclic ether tetrahydropyran. In this run the zinc dust was reacted at 90° C. for one-half hour, and yielded a light green product, indicating that a complex had been formed between the ether and the vanadium which was susceptible of being reduced by reaction with the zinc.

In the second run, the ether utilized was 1,2-dimethoxyethane. Even after heating for 7 hours at 90° C. no reaction was visible between the zinc dust and the other reactants.

In the third run, the ether was diethyl ether. Again, no reaction was apparent on adding the zinc dust even after 3 hours at 90° C.

In the final run, the ether was a di-n-butyl ether. Again, no reaction was apparent on adding the zinc dust and no reaction was evident after 3 hours at 90° C.

The above results indicate that cyclic ethers are effective in complexing higher valent vanadium compounds such as vanadium tetrachloride for subsequent reduction with a zinc component such as zinc metal to give vanadium dichloride but that noncyclic ethers are not effective in this route, even though noncyclic ethers can be utilized in the first route where the reduction to $VCl_2$ is achieved first.

While this invention has been described in detail for the purpose of illustration, it is not to be construed as limited thereby but is intended to cover all changes and modifications within the spirit and scope thereof.

We claim:

1. A composition comprising a vanadium dihalide-ether complex on a solid porous carrier.
2. A composition according to claim 1 wherein said halide is chloride.
3. A composition according to claim 2 wherein said complex is formed from a cyclic ether.
4. A composition according to claim 3 wherein said cyclic ether is tetrahydrofuran.
5. A composition according to claim 4 wherein said porous carrier is selected from at least one of silica, aluminum phosphate, phosphated alumina, and alumina.
6. A composition according to claim 2 wherein said carrier is selected from at least one of silica, aluminum phosphate, phosphated alumina, and alumina.
7. An olefin polymerization catalyst comprising a composition according to claim 2 and a cocatalyst.
8. A composition according to claim 7 wherein said cocatalyst is an organoaluminum compound.
9. A composition according to claim 8 wherein said organoaluminum compound is triethylaluminum.
10. A composition according to claim 7 wherein said cocatalyst is an organoboron compound.
11. A composition according to claim 10 wherein said organoboron compound is triethylborane.
12. A method comprising:
    forming a $VX_2$ complex with an ether, X being a halogen; and
    combining said complex with a porous solid support.
13. A method according to claim 12 wherein X is chlorine.
14. A method according to claim 13 wherein said complex is formed by carrying out an electrolytic reduction of $VCl_3$ in alcohol to produce a $VCl_2$-alcohol complex which is then reacted with an ether to produce a $VCl_2$-ether complex.
15. A method according to claim 14 wherein said ether is a cyclic ether.
16. A method according to claim 15 wherein said ether is tetrahydrofuran and the resulting vanadium dihalide-ether complex is $VCl_2 \cdot 2THF$.
17. A method according to claim 16 wherein said support is selected from at least one of silica, aluminum phosphate, phosphated alumina, and alumina.
18. A method according to claim 13 wherein said support is selected from at least one of silica, aluminum phosphate, phosphated alumina, and alumina.
19. A product produced by the method of claim 12.
20. A method comprising:
    contacting a cyclic ether with a vanadium compound selected from $VX_4$ and $VX_3$ wherein X is a halogen to form a complex;
    contacting said complex with a reducing agent at least a part of which is selected from zinc metal and organozinc compounds to reduce the valence of said vanadium to +2; and
    combining the thus produced $VX_2$-ether-zinc complex with a porous support.
21. A method according to claim 20 wherein said ether is tetrahydrofuran.
22. A method according to claim 20 wherein said vanadium compound is $VCl_4$ and said $VCl_4$ is reacted in a chlorinated hydrocarbon solvent with said ether, said ether being THF, to give a $VCl_4$—THF complex;
    thereafter said $VCl_4$—THF complex is contacted with a reducing agent selected from at least one of zinc metal and organozinc compounds to give a product comprising $VCl_2 \cdot ZnCl_2 \cdot 4THF$.
23. A method according to claim 22 wherein prior to contacting said $VCl_4$-ether complex with said zinc metal or an organozinc compound, the $VCl_4$ is reduced to $VCl_3$ with a separate reducing agent.
24. A method according to claim 23 wherein said separate reducing agent is selected from organoboron compounds and organoaluminum compounds.
25. A method according to claim 24 wherein said separate reducing agent is triethylborane.
26. A method according to claim 22 wherein said chlorinated hydrocarbon solvent is dichloromethane.
27. A method according to claim 20 wherein said vanadium compound is $VCl_4$ and said $VCl_4$ is dissolved in said ether as the only solvent to form said $VCl_4$-ether complex.
28. A method according to claim 20 wherein said vanadium compound is $VCl_3$ and said complex is prepared by contacting said $VCl_3$ and said ether in the presence of a catalyst.
29. A method according to claim 28 wherein said catalyst is sodium hydride.
30. A method according to claim 29 wherein said ether is tetrahydrofuran.
31. A method according to claim 20 wherein said ether is tetrahydropyran.
32. A method according to claim 20 wherein said support is selected from at least one of silica, aluminum phosphate, phosphated alumina, and alumina.
33. A method according to claim 20 wherein said complex is $VCl_2 \cdot 3THF$, and wherein about one-half mole of said reducing agent is used per mole of $VCl_2 \cdot 3THF$, said contacting taking place in THF to give $2VCl_2 \cdot ZnCl_2 \cdot 6THF$.
34. A product produced by the process of claim 20.
35. $VCl_2 \cdot ZnCl_2 \cdot 2THF$.
36. $VCl_2 \cdot ZnCl_2 \cdot 4THF$.
37. A method comprising contacting THF with $VCl_4$ in a chlorinated hydrocarbon solvent to give a $VCl_4$—THF complex
    thereafter contacting said $VCl_4$—THF complex with a reducing agent selected from at least one of zinc metal and organozinc compounds to give a product comprising $VCl_2 \cdot ZnCl_2 \cdot 4THF$.
38. A method according to claim 37 wherein said $VCl_2 \cdot ZnCl_2 \cdot 4THF$ is separated and dissolved in a chlorinated hydrocarbon solvent to form a $VCl_2 \cdot ZnCl_2 \cdot 2THF$ precipitate.

* * * * *